United States Patent
Petit et al.

(10) Patent No.: US 6,409,791 B1
(45) Date of Patent: Jun. 25, 2002

(54) METALLOTHERMAL PROCESS AND CONTINUOUS DRAWING, IN COLD INDUCTION FURNACES, OF METALS OR ALLOYS

(75) Inventors: Jany Petit, Serignan du Comtat; Laurent Philippe, Voglans; Véronique Hurbin, Saint Paul Châteaux, all of (FR)

(73) Assignee: Compagnie Generale des Matieres Nucleaires, Velizy Villacoublay (FR)

( * ) Notice: Subject to any disclaimer, the term of this patent is extended or adjusted under 35 U.S.C. 154(b) by 0 days.

(21) Appl. No.: 09/463,255
(22) PCT Filed: Jul. 23, 1998
(86) PCT No.: PCT/FR98/01630
§ 371 (c)(1),
(2), (4) Date: Apr. 10, 2000
(87) PCT Pub. No.: WO99/05330
PCT Pub. Date: Feb. 4, 1999

(30) Foreign Application Priority Data

Jul. 25, 1997 (FR) .............................................. 97 09500

(51) Int. Cl.⁷ .............................. C22B 9/18; C22B 9/187
(52) U.S. Cl. ...................... 75/10.14; 75/10.54; 75/398; 373/142; 373/144
(58) Field of Search ............................... 75/10.14, 398, 75/10.54; 373/142, 144, 156, 155, 158, 159

(56) References Cited

U.S. PATENT DOCUMENTS

| | | | |
|---|---|---|---|
| 2,365,346 A | * 12/1944 | Kruh | 373/59 |
| 3,721,549 A | 3/1973 | Gallay et al. | 75/84.1 |
| 3,847,596 A | 11/1974 | Holland et al. | 75/84.4 |
| 5,280,496 A | * 1/1994 | Schlecht et al. | 373/158 |
| 5,290,337 A | 3/1994 | Sharma | 75/393 |
| 5,563,904 A | 10/1996 | Colpo et al. | 373/146 |

FOREIGN PATENT DOCUMENTS

| | | | |
|---|---|---|---|
| EP | 0 521 608 | 1/1993 | C22B/60/02 |
| FR | 2002771 | 10/1969 | C22B/5/00 |
| FR | 2688516 | 9/1993 | C22B/9/21 |
| FR | 2708725 | 2/1995 | F27B/14/06 |
| GB | 2265805 | 10/1993 | H05B/11/00 |
| GB | 2279543 | 1/1995 | H05B/6/24 |

OTHER PUBLICATIONS

John D. Leland, "Economically Producing Reactive Metals by Aerosol Reduction", Jom, Journal of Metals, vol. 48, No. 10, pp. 52–55, XP002061287 Oct. 1996.

* cited by examiner

Primary Examiner—Roy King
Assistant Examiner—Tima McGuthry-Banks
(74) Attorney, Agent, or Firm—Pearne & Gordon LLP

(57) ABSTRACT

A metallothermy method includes continuously withdrawing an ingot of a metal product such as uranium or a uranium alloy as it is formed from an oxide or salt of the metal. The method employs upper and lower communicating crucibles. The upper crucible contains a layer of reducing medium floating on a solvent medium. The metal oxide or metal salt is reduced as it is introduced into the layer reducing medium to form metal particles and slag. The settling metal is melted by further induction heating, collected in the lower crucible and withdrawn. The slag is absorbed by the solvent medium which is regenerated with the use of electrolysis.

15 Claims, 1 Drawing Sheet

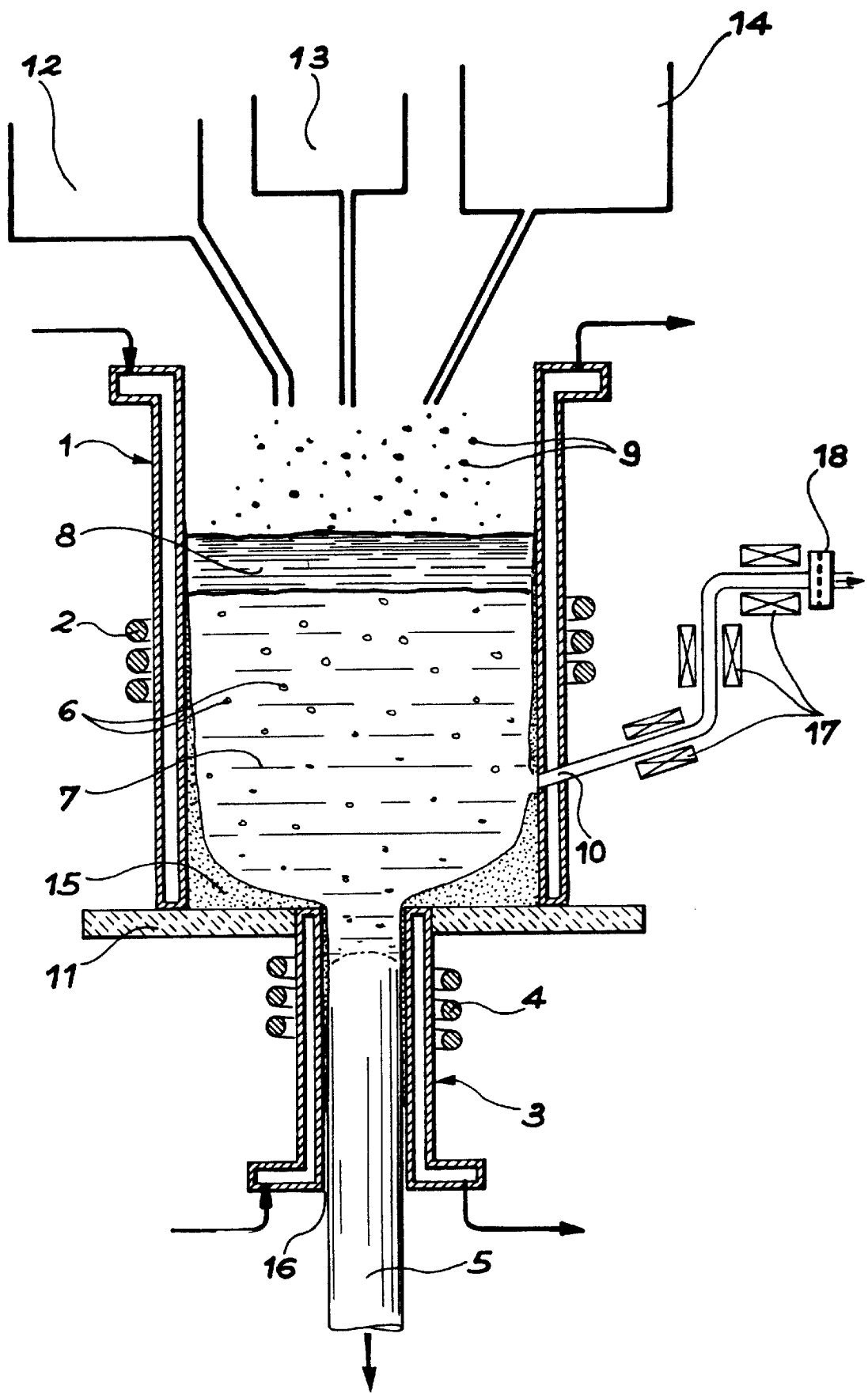

METALLOTHERMAL PROCESS AND CONTINUOUS DRAWING, IN COLD INDUCTION FURNACES, OF METALS OR ALLOYS

TECHNICAL FIELD

This invention relates to the metallothermy and continuous drawing off of metals or alloys, in cold inductive crucibles. The metals or alloys are produced from metallic oxides or salts. The invention particularly concerns the preparation of uranium metal from a uranium oxide or salt. It also concerns the preparation of an alloy of uranium or another metal.

State of Prior Art

Conventionally, uranium metal is obtained after transformation of $UO_2$ oxide into $UF_4$, followed by a step to reduce the tetrafluoride into uranium metal. No current industrial process is capable of directly producing solid uranium metal ingot from the dioxide. The action of a reducing metal such as Ca or Mg on uranium dioxide, despite its very strong exothermal nature, cannot melt the lime or magnesia, and uranium metal is obtained divided in an unmeltable solid. The slag may be dissolved in an acid, but the processing cost is prohibitive for large scale production and there is a risk that the divided metal could be attacked. On the other hand, the slag composed of fluorite or sellaite formed during reduction of $UF_4$ by these metals is relatively meltable. The uranium assembles in situ in the form of an ingot. Slag generates a solid waste, treated by a wet method before being permanently stored in a controlled tip.

At the present time, constraints necessary for the reduction of waste involve the use of recycling processes, for example using electrolysis.

Patent U.S. Pat. No. 5,290,337 divulges a process for the reduction of uranium oxide by magnesium capable of recovering uranium metal and regenerating the metallic reduction agent. Uranium oxide (for example $UO_2$) is reduced in the presence of molten salts, for example $MgCl_2/MgF_2$ or $MgCl_2/NdCl_3$ in order to improve the settlement of uranium metal, as recommended by C. MORANVILLE and J. DUBUISSON in *Le Nouveau Traité de Chimie Minérale* (The New Treatise of Inorganic Chemistry) published under the management of P. PASCAL, Volume XV, book 1, 1960, Masson and Company, page 187, and J. H. BUDDERY in Metallurgy and Fuels, 1956, vol. 4, pages 24–32. The metal is recovered in a layer of molten ZnMg or CuMg alloy. $UO_2$ is added into the two-phase medium composed of the molten alloy (ZnMg) and the mix of molten salts ($MgCl_2/NdCl_3$), stirred and heated to 750° C. Some of the magnesium reduces $UO_2$ by forming U and MgO. The MgO then reacts with neodymium chloride to produce magnesium chloride and neodymium oxide. The uranium metal is incorporated in the ZnMg phase. When the reactional medium is no longer stirred, the phases separate. The denser metallic phase settles at the bottom of the crucible. After cooling and solidification, the phases are mechanically separated. The uranium metal is then separated by evaporation of ZnMg. Mg is regenerated by electrolysis of the salt.

Thus according to U.S. Pat. No. 5,290,337, reduction of $UO_2$ by Mg takes place in a two-phase mix while being stirred. The principle of two separate phases only appears after the end of the process that can only be a discontinuous system ("batch process"). Therefore, this process has the disadvantage that it cannot directly and continuously produce uranium metal at the output from the crucible. Two additional steps are necessary to separate the constituents, firstly a mechanical separation of the phases and then a distillation. Furthermore, the bath is necessarily remelted before electrolysis and regeneration of Mg, and it cannot subsequently be recycled unless an additional step is added to convert the neodymium oxide into chloride.

Since the 1960s, many studies, publications and patents have been made on continuous melting and drawing off of ingots. The metal is usually added directly into the drawing off crucible, after being produced in other structures, for example by electrolysis, metallothermy or reduction by a metalloid (carbon, sulfur).

The "Economically Producing Reactive Metals by Aerosol Reduction" article by J. D. LELAND, published in the J.O.M. review, pages 52–55, October 1996, divulges a process for obtaining titanium, hafnium or zirconium semi-continuously from their precursor salts (chlorides). The reduction process by aerosols consists of a reaction between two jets of products.

The reducing metal (for example Na or Mg) is in the form of an aerosol between 400 and 600° C., and the metal chloride to be reduced is in vapor form. Due to the exothermal nature of the reaction, the chloride formed is vaporized whereas the solid metal drops to the bottom of a liquid metal bath. The temperature of the medium is stabilized at about the boiling point of the salt formed, typically 1100–1200° C. The metal is collected and molten starting from the bottom of the bath in an inductive cold crucible. This process has two main disadvantages, firstly the necessity to have an exothermal reaction in order to vaporize the slag and the initial product that has not reacted, and the difficulty in controlling feed flows. Furthermore, this process would not be applicable in the case of exothermal reactions in which there is a risk of reaching the thermodynamic inversion temperature or if the slag boiling temperature exceeds the thermodynamic inversion temperature.

DESCRIPTION OF THE INVENTION

The invention overcomes the disadvantages of prior art mentioned above by proposing a solution that enables complete and continuous production as far as the preformed metal, starting from the metal salt or oxide.

Therefore, the purpose of the invention is a metallothermy and continuous drawing off process for a metal product, composed of at least one metal, comprising:

a metal production step in a first cold crucible heated by induction in which reduction of the oxide or salt of the said metal is provoked in a reducing medium composed of a floating layer of melting material and in which the formed metal settles in a solvent medium consisting of a bath composed of at least one molten salt that absorbs the slag resulting from the reduction reaction, the maximum input flow of the floating layer of oxide or salt of the said metal being determined by the thickness of the floating layer and the temperature of its top surface such that the reduction of the oxide or salt of the said metal takes place entirely in the floating layer;

a step in which the settled metal is collected and melted, that takes place in a second cold crucible heated by induction located under the first cold crucible, in order to enable continuous drawing off of the metallic product.

This determination of the maximum feed flow may depend on test results and/or a model to produce nomograms. The floating reducing medium can be used to perfectly control the temperature and avoid reversibility of the reactions.

Induction heating of the first crucible and the second crucible can take place at different frequencies.

The reducing medium may include a material chosen among a metal, a mix of metals, a metalloid or a mix of metalloids.

The oxide or the salt of the said metal to be produced may be added into the first cold crucible above the layer if this oxide or salt is in the solid state or the liquid state. The oxide or salt of the said metal to be produced may be added into the first cold crucible under the layer if this oxide or salt is in the gaseous state.

If the metallic product to be produced is an alloy of at least two metals, the first cold crucible may be fed by a mix of oxide(s) or salt(s) of these two metals. As a variant, one of these metals may be added into the first cold crucible directly in its metallic form, the other of these metals being added in the form of an oxide or salt.

Advantageously, the process also comprises a step in which the reducing medium is regenerated by electrolysis of the slag present in the solvent medium. The solvent medium is drawn off continuously.

Another purpose of the invention is a device for embodiment of the process described above, characterized in that it comprises:

- a first crucible with cold walls equipped with induction heating means and means of adding the oxide or salt of the said metal to be produced into the reducing medium.
- a second crucible with cold walls equipped with induction heating means located under the first crucible, the upper part of the second crucible communicating with the lower part of the first crucible, the lower part of the second crucible being provided with means of continuously draining the metallic product.

Preferably, this first crucible has a larger cross sectional area than the second crucible. In this case, the junction between the two crucibles may be formed by a board of refractory material, for example a ceramic board.

Preferably, the induction heating means are located on the first and second crucibles such that it forms a settlement cone composed of the solid solvent medium, under the influence of the cold walls of the crucibles.

Advantageously, the first crucible is equipped with means of drawing off the solvent medium, operating continuously. It is also equipped with means of adding the reducing medium, operating continuously. It is also equipped with means of adding the oxide or salt of the said metal to be produced, operating continuously.

The process according to this invention is particularly applicable to obtaining uranium metal.

If the uranium compound that is reduced is $UO_2$ oxide or $U_3O_8$ oxide, the reducing medium may consist of lithium, and the solvent medium may comprise at least one of the following salts: LiCl, KCl, $BaCl_2$, LiF, $CaF_2$ and $BaF_2$. If the uranium compound that is reduced is $UF_4$, the reducing medium may be composed of a metal chosen among Ca, Mg, Li, K, Na or a Ca-Mg mix, the solvent medium may comprise at least one of the following salts: $MgF_2$, $MgCl_2$, LiCl, KCl, $BaCl_2$, LiF, KF, $CaCl_2$, $CaF_2$, NaF, NaCl and $BaF_2$. If the uranium compound that is reduced is a double fluoride of uranium and an alkali or alkali earth element, the reducing medium may be a metal chosen among Ca, Mg, Li, Na or K, or a mix of at least two of these reducing metals, and the solvent medium may include at least one of the following salts: $MgF_2$, $MgCl_2$, LiCl, KCl, NaCl, NaF, $BaCl_2$, LIF, $CaF_2$, $CaCl_2$ and $BaF_2$. If the uranium compound that is reduced is $Cs_2Ucl_6$, the reducing medium may be a metal chosen among Ca, Mg or Li or a mix of at least two of these reducing metals, the solvent medium may comprise at least one of the following salts: LiCl, KCl, CsCl, $BaCl_2$, LiF, $CaF_2$, $BaF_2$, $MgF_2$ and $MgCl_2$.

BRIEF DESCRIPTION OF THE DRAWING

The invention will be better understood, and other advantages and specific features will become clear after reading the following description, given as a non-restrictive example, accompanied by the attached FIGURE which is a longitudinal sectional view through a device comprising two crucibles with cold walls used for the embodiment of the process according to this invention.

DETAILED DESCRIPTION OF AN EMBODIMENT OF THE INVENTION

Metallothermy and drawing off of metals or alloys according to the invention take place in two cold inductive crucibles with different sizes (height, diameter, geometry). The innovation lies in the fact that the two crucibles are superposed and that the two steps of the process are perfectly continuous.

The metal is produced by reduction of an oxide or a salt of this metal in the upper crucible. For example, the reducing agent may be a metal or a mix of metals with a higher reducing capacity than the metal to be produced, or a metalloid (carbon or sulfur). The metal formed is settled in a solvent medium, for example a molten salt or a liquid metal that is immiscible with the reduction agent or the metal formed. The metal is collected and the ingot is drawn off in the lower cold inductive crucible, the diameter or the cross-section of the crucible being determined as a function of the required form (wire, bars, etc.).

The process according to the invention is applicable particularly for obtaining metal by metallothermic reduction and separation in a molten salt bath. The salt or oxide is reduced in a layer of melting reducing metal (pure or a mixture) floating on a molten salt bath. The reduction agent is chosen for its reduction capacity, its density and for its inability to form an alloy with the metal to be produced. Therefore, this metal passes through the layer of reducing metal and then settles in the molten salt bath. The molten salt is determined as a function of several criteria including its ability to solubilize the slag, its density, its stability with respect to the various metals present, and its melting and boiling temperatures. Since the slag is solubilized by the salt, metal is obtained pure at the bottom of the reaction crucible and is molten and then drawn off in the lower inductive crucible starting from the bottom of the liquid bath.

A variant of the process consists of reducing a mix of salts or oxides of different metals and directly drawing off an alloy of these metals. One of these metals may also advantageously be added in solid form (metallic powder).

Unlike prior art, the use of a buffer area of molten salt (denser than the reducing metal and less dense than the metal to be recovered) to physically separate the reducing and melting areas, makes it possible to consider the use of reactions for which the thermodynamic inversion temperature would be reached in a "batch" system due to the exothermal nature or melting of the metal produced. The intermediate salt bath makes it possible to impose a temperature gradient on the system such that the temperature is higher at the bottom of the first crucible. Furthermore, since the reaction takes place in a cold inductive crucible, the heat generated by the reaction in the layer of reducing metal can be dissipated. Therefore the exothermal nature of the reaction considered can be controlled. It is also important to note that the reaction does not have to be highly exothermal in this process.

The attached FIGURE shows a longitudinal cross-sectional view of the cold crucibles used for embodiment of the process according to the invention, for example for reduction of an oxide by a reducing metal. It comprises a first cylindrically shaped cold crucible 1 on top of a second cold crucible 3, also cylindrically shaped but with a smaller diameter. Crucibles 1 and 3 are fitted together through a ceramic board 11 on which the crucible 1 is placed. An orifice in board 11 enables placement of the second cold crucible 3. The proximity of the cooling system for the two cold crucibles enables the formation of the automatic settlement cone 15 composed of a solid salt. A high frequency induction coil 2 is located around the first crucible 1 and a medium frequency coil 4 is located around the second crucible 3. According to the invention, the first crucible 1 is filled with molten salts 7 on top of which floats a layer of reducing metal 8. The metal compound to be treated 12 is added in solid form (for example powder 9), or liquid form on the layer of reducing metal 8. Solid particles of the produced metal 6 settle in the liquid salts bath 7 and are collected in the second crucible 3 and are then molten and drawn off in the form of an ingot 5. The ingot is continuously drained through the orifice 16. The salt bath 7 solubilizes the slag (or sub-product) and is evacuated through the orifice 10 formed in the crucible 1. The height of the drawing off orifice must be determined to avoid entraining the required metal. The electromagnetic pressure forces exerted on the decanting metal can avoid this phenomenon. However, a filter 18 may be added on the drawing off pipe to retain the metal to be produced in the first crucible. In order to prevent the material from solidifying in the drain pipes between the bath and the electrolysis unit (not shown), the pipes are provided with inductive or resistive heating systems 17. After electrolysis of the bath and the slag (not shown), the reducing metal 14 and the salt 13 forming the bath, are added back into reaction vessel 1.

If the required metal is uranium, the process as described can be used to obtain this metal particularly from oxides ($UO_2$, $UO_3$, or $U_3O_8$) or fluoride ($UF_4$, double fluoride). The reducing metal is Ca, Mg, or Li alone or mixed for oxides, and Na, Li, K, Ca or Mg alone or mixed for fluorides. For $UF_4$, or a double uranium fluoride, the possibility of a liquid phase feed will be very advantageous compared with prior art. The reduction reaction will then take place in a single phase liquid-liquid system.

Apart from reactivity constraints with the compound to be reduced, the choice of the reducing metal depends on its density in the liquid phase compared with the density of the molten salts bath, and the following considerations. The melting temperature of the reducing medium must be as low as possible to enable circulation in the liquid phase between the electrolysis unit and the reaction vessel, and it must be as different as possible from the thermodynamic inversion temperature (for example Li reduces $UO_2$ below 850° C., and U reduces $Li_2O$ at higher temperatures). The boiling temperature of the reducing metal will be sufficiently high to enable a large choice of compatible salts. The important points for salts are the melting temperature, their lack of reactivity with the various metals present within the temperature range considered, and their ability to integrate (solubility or mix) a large proportion of slag. This latter point has a controlling influence on the sizing of the associated electrolysis unit to the extent that it is industrially preferable to avoid the use of a system close to the diffusion limit of the compound to be electrolyzed. The boiling temperature of the salt bath will necessarily exceed the melting temperature of the reducing metal and of the metal produced at the design operating pressure.

Allowing for all these technical considerations, the use of Li as a reducing metal is attractive for the reduction of uranium dioxide. Various mixes based on LiCl, KCl, $BaCl_2$, $BaF_2$, LiF or $CaF_2$ may be suitable for the salt bath. The selected mixes, binary or at most ternary, have melting temperatures below 500° C., which can give an Li—salts interface temperature of the order of 600° C.

The process according to this invention may be used to produce metals other than uranium, either alone or in a mix starting from their oxides or salts. These metals are particularly Sc, Y, La, Ga, Tl, La, the rare earths (Ce, Pr, Nd, Pm, Sm, Eu, Gd, Tb, Dy, Ho, Er, Tm, Yb, Lu), Be, Ti, Zr, Hf, Si, Ge, V, Nb, Ta, Cr, Fe, Pu, etc. This list is not exhaustive, and all elements in the periodic table can be used within the framework of the invention.

Similarly, reducing agents other than alkalis or alkali earths can be used. The objective is to use metals that have a higher reducing capacity than the metal to be reduced, or metalloids like carbon or sulfur.

The compound to be treated can be added in solid or liquid form above the metallic layer, or as a gas under this layer.

When materials are produced using metalloids, the mix of the molten salts may act as a solvent for the reaction. The metalloid is dispersed in the bath that then behaves like a fluidized bed.

The process is also applicable for the production and concentration by melting, of materials other than pure metals or bodies from their oxides or salts. For example, the recuperation of boron carbide sponges starting from boron and carbon oxides.

What is claimed is:

1. A metallothermy method for continuously forming an ingot of a metal from a metal salt or a metal oxide of said metal comprising the steps of:
    a) providing a first cold crucible heated by induction and a second cold crucible heated by induction, said second crucible being in fluid communication with and located under said first cold crucible to continuously form said ingot,
    b) forming a layer of a melting material composed of a reducing medium floating on a solvent medium composed of at least one molten salt in said first cold crucible,
    c) introducing said metal salt or metal oxide into said layer,
    d) reducing said metal salt or metal oxide entirely in said layer and forming particles of slag and of said metal,
    e) settling said metal particles downwardly through said solvent medium in said first cold crucible to pass said metal particles into said second cold crucible and solubilizing said slag in said solvent medium,
    f) collecting and melting said metal particles in said second cold crucible to form said ingot,
    g) continuously drawing off said ingot from said second cold crucible.

2. The method of claim 1, wherein said induction heating of said first and second crucibles is done at different frequencies.

3. The method of claim 1, wherein said reducing medium includes a material selected from the group consisting of a metal, a mix of metals, a metalloid or a mix of metalloids.

4. The method according to claim 1, wherein said metal salt or metal oxide is in a solid state or a liquid state and added to said first cold crucible above said layer.

5. The method according to claim 1, wherein said metal salt or metal oxide is in a gaseous state and added to said first cold crucible under said layer.

6. The method of claim 1, wherein said metal of said ingot is an alloy of at least two alloying metals, and said metal salt or metal oxide is a mix of oxide(s) or salt(s) of the two alloying metals.

7. The method of claim 1, wherein said metal of said ingot is an alloy of at least two alloying metals, one of the alloying metals being added into said first cold crucible directly in its metallic form, the other of the alloying metals being added in the form of an oxide or a salt.

8. The method of claim 1, further including regenerating said reducing medium by electrolysis of said solvent medium.

9. The method of claim 8, wherein said step of regenerating said reducing medium by electrolysis includes continuously withdrawing said solvent medium to be regenerated by electrolysis.

10. The method of claim 1, wherein said metal of said ingot is uranium metal or a uranium alloy.

11. The method of claim 10, wherein said metal oxide is $UO_2$ oxide or $U_3O_8$ oxide, the reducing medium consists of lithium, and the solvent medium comprises at least one salt selected from the group consisting of LiCl, KCl, $BaCl_2$, LiF, $CaF_2$ and $BaF_2$.

12. The method of claim 10, wherein said metal salt is $UF_4$, the reducing medium is composed of a metal selected from the group consisting of Ca, Mg, Li, K, Na or a Ca-Mg mix, the solvent medium comprises at least one salt selected from the group consisting of $MgF_2$, $MgCl_2$, LiCi, KCl, $BaCl_2$, LiF, KF, $CaF_2$, $CaCl_2$, NaF, NaCl and $BaF_2$.

13. The method of claim 10, wherein said metal salt is a double fluoride of uranium and an alkali or alkali earth element, the reducing medium is a metal selected from a group consisting of Ca, Mg, Li, Na or K, or a mix of at least two of these reducing metals, and the solvent medium comprises of at least one salt selected from the group consisting of $MgF_2$, $MgCl_2$, LiCl, KCl, NaCl, NaF, $BaCl_2$, LiF, KF, $CaF_2$, $CaCl_2$ and $BaF_2$.

14. The method of claim 10, wherein said metal salt is $CS_2UCl_6$ the reducing medium is a metal selected from the group consisting of Ca, Mg or Li or a mix of at least two of the e reducing metals, the solvent medium comprises at least one salt selected from the group consisting of LiCl, KCl, CsCl, $BaCl_2$, LiF, $CaF_2$, $BaF_2$, $MgF_2$ and $MgCl_2$.

15. The method of claim 11, wherein steps (c) and (d) include determining a maximum input flow of said metal salt or metal oxide based on the thickness of said layer and the temperature at a top surface of said layer to assure reducing said metal salt or metal oxide entirely in said layer and forming particles of said metal and slag.

* * * * *

UNITED STATES PATENT AND TRADEMARK OFFICE
CERTIFICATE OF CORRECTION

PATENT NO.     : 6,409,791 B1
DATED          : June 25, 2002
INVENTOR(S)    : Jany Petit et al.

Page 1 of 1

It is certified that error appears in the above-identified patent and that said Letters Patent is hereby corrected as shown below:

<u>Column 8,</u>
Line 21, delete "claim 11" and insert -- claim 1 --.

Signed and Sealed this

Twenty-first Day of January, 2003

JAMES E. ROGAN
*Director of the United States Patent and Trademark Office*